US 9,207,319 B2

(12) United States Patent
Starr et al.

(10) Patent No.: US 9,207,319 B2
(45) Date of Patent: Dec. 8, 2015

(54) COLLISION-AVOIDANCE SYSTEM FOR GROUND CREW USING SENSORS

(71) Applicant: Honeywell International Inc., Morristown, NJ (US)

(72) Inventors: Jeffrey W. Starr, Albuquerque, NM (US); Andrew Fannon Lamkin, Albuquerque, NM (US); Duke Buster, Albuquerque, NM (US)

(73) Assignee: Honeywell International Inc., Morris Plains, NJ (US)

( * ) Notice: Subject to any disclaimer, the term of this patent is extended or adjusted under 35 U.S.C. 154(b) by 171 days.

(21) Appl. No.: 13/689,495

(22) Filed: Nov. 29, 2012

(65) Prior Publication Data

US 2013/0321192 A1 Dec. 5, 2013

Related U.S. Application Data

(60) Provisional application No. 61/706,632, filed on Sep. 27, 2012.

(51) Int. Cl.
*G01S 13/93* (2006.01)
*G01S 7/04* (2006.01)
(Continued)

(52) U.S. Cl.
CPC . *G01S 13/93* (2013.01); *G01S 7/04* (2013.01); *G01S 13/87* (2013.01); *G01S 13/91* (2013.01); *G08G 5/065* (2013.01)

(58) Field of Classification Search
CPC ..... G08G 5/065; G08G 5/045; G08G 5/0082; G08G 5/06; G01S 13/931; G01S 2013/9335; G01S 13/87; G01S 13/91; G01S 13/93; G01S 2013/916; G01S 7/04

USPC ........... 342/29, 36, 52, 59, 69, 179, 181–183; 340/955, 958, 961, 983
See application file for complete search history.

(56) References Cited

U.S. PATENT DOCUMENTS

| 5,381,338 A | 1/1995 | Wysocki et al. |
| 5,448,243 A | 9/1995 | Bethke et al. |

(Continued)

FOREIGN PATENT DOCUMENTS

| EP | 2530486 A3 * | 1/2013 |
| JP | 2011028579 A | 2/2011 |
| WO | 2013181334 A1 | 12/2013 |

OTHER PUBLICATIONS

Thierry Dubois, Eurocopter Researches Low-Cost Obstacle Warning; Aviation International News, May 2012; http://www.ainonline.com/aviation-news/aviation-international-news/2012-05-02/eurocopter-researches-low-cost-obstacle-warning, 3 pages.

(Continued)

*Primary Examiner* — John B Sotomayor
(74) *Attorney, Agent, or Firm* — Shumaker & Sieffert, P.A.

(57) ABSTRACT

A ground crew collision-avoidance system includes a plurality of radar sensor modules that each emit a radar signal, receives at a radar detector radar return signals corresponding to reflections of the emitted signal from a ground object, and transmits radar information associated with the received radar signal reflections reflected from the ground object, wherein each of the plurality of radar sensor modules are uniquely located on a surface of an aircraft that is at risk for collision with a ground object while the aircraft is being towed; a gateway unit that receives the radar information transmitted from the radar sensor module and transmits information associated with the received radar information; and a ground crew alert indicator that receives the information transmitted by the gateway unit and that presents a graphical alert icon on a display. The display indicates a likelihood of collision between the aircraft and the ground object.

20 Claims, 5 Drawing Sheets

(51) Int. Cl.
*G01S 13/87* (2006.01)
*G01S 13/91* (2006.01)
*G08G 5/06* (2006.01)

(56) References Cited

U.S. PATENT DOCUMENTS

| | | | |
|---|---|---|---|
| 5,983,161 | A | 11/1999 | Lemelson et al. |
| 6,118,401 | A | 9/2000 | Tognazzini |
| 6,246,320 | B1 | 6/2001 | Monroe |
| 6,895,332 | B2 | 5/2005 | King et al. |
| 7,379,165 | B2 | 5/2008 | Anderson et al. |
| 7,463,183 | B2 | 12/2008 | Reich |
| 7,561,037 | B1* | 7/2009 | Monroe ............... 340/521 |
| 7,579,980 | B2* | 8/2009 | Anderson et al. ........ 342/70 |
| 7,839,322 | B2 | 11/2010 | Filias et al. |
| 7,903,023 | B2 | 3/2011 | Cornic et al. |
| 7,932,838 | B2 | 4/2011 | Hamza et al. |
| 8,019,529 | B1* | 9/2011 | Sharma et al. ........... 701/117 |
| 8,121,786 | B2* | 2/2012 | Morbey et al. ........... 701/300 |
| 8,378,852 | B2 | 2/2013 | Naimer et al. |
| 8,629,800 | B2* | 1/2014 | Anderson et al. ........ 342/109 |
| 2002/0109625 | A1 | 8/2002 | Gouvary |
| 2003/0067542 | A1* | 4/2003 | Monroe ................ 348/148 |
| 2005/0007257 | A1* | 1/2005 | Rast .................. 340/815.45 |
| 2006/0066470 | A1* | 3/2006 | Anderson et al. ........ 342/29 |
| 2006/0119472 | A1 | 6/2006 | Tsuboi |
| 2008/0062011 | A1* | 3/2008 | Butler et al. ........... 340/961 |
| 2008/0103641 | A1 | 5/2008 | Ratcliffe |
| 2008/0172178 | A1* | 7/2008 | Anderson et al. ........ 701/301 |
| 2008/0180310 | A1 | 7/2008 | Reich |
| 2008/0198041 | A1 | 8/2008 | Sallier et al. |
| 2008/0306691 | A1 | 12/2008 | Louis et al. |
| 2009/0033552 | A1 | 2/2009 | Kirmuss et al. |
| 2009/0164122 | A1* | 6/2009 | Morbey et al. ........... 701/301 |
| 2009/0174591 | A1 | 7/2009 | Cornic et al. |
| 2009/0295622 | A1* | 12/2009 | Anderson et al. ........ 342/71 |
| 2009/0323046 | A1 | 12/2009 | Tan et al. |
| 2010/0123599 | A1 | 5/2010 | Hamza et al. |
| 2010/0219988 | A1 | 9/2010 | Griffith |
| 2011/0015816 | A1* | 1/2011 | Dow et al. ............. 701/23 |
| 2011/0224845 | A1 | 9/2011 | Perry et al. |
| 2012/0092208 | A1 | 4/2012 | LeMire et al. |
| 2012/0130624 | A1 | 5/2012 | Clark et al. |
| 2012/0200433 | A1 | 8/2012 | Glover et al. |
| 2013/0096814 | A1* | 4/2013 | Louis et al. ............ 701/301 |
| 2013/0120164 | A1 | 5/2013 | Greene et al. |
| 2013/0127642 | A1 | 5/2013 | Maggiore et al. |
| 2013/0321169 | A1 | 12/2013 | Bateman et al. |
| 2013/0321176 | A1 | 12/2013 | Vasek et al. |
| 2013/0321192 | A1* | 12/2013 | Starr et al. ............. 342/29 |
| 2013/0325245 | A1 | 12/2013 | Kolcarek et al. |
| 2013/0345906 | A1* | 12/2013 | Kabrt et al. ............ 701/3 |
| 2014/0062756 | A1* | 3/2014 | Lamkin et al. ........... 342/29 |

OTHER PUBLICATIONS

Toshiki Yamawaki et al., 60-GHz Millimeter-Wave Automotive Radar, Fujitsu Ten Tech., No. 11, 1998, 12 pages.
Examination Report from counterpart European Patent Application No. 13166677.8, dated Jan. 14, 2015, 8 pp.
Search Report from counterpart European Application No. 13166677.8, dated Dec. 15, 2014, 3 pp.
Abstract of "Pilots view airport charts," Engineering Village, May 2005, retrieved from www.engineeringvillage.com on Jun. 21, 2013, 1 pp.
Kamineni et al., "Electronic Moving Map of Airport Surface on Electronic Flight Bag," IEEE, Digital Avionics Systems Conference, Oct. 24-28, 2004, vol. 1, 9 pp.
Response to Examination Report dated Jan. 14, 2015, from counterpart European Patent Application No. 13166677.8, filed May 13, 2015, 21 pp.

* cited by examiner

COLLISION-AVOIDANCE SYSTEM FOR GROUND CREW USING SENSORS

PRIORITY CLAIM

This application claims the benefit of U.S. Provisional Application Ser. No. 61/706,632, filed Sep. 27, 2012, the content of which is hereby incorporated by reference in its entirety. The entire content of U.S. Provisional Application Serial No. 61/653,297, filed May 30, 2012, is also incorporated by reference herein.

BACKGROUND OF THE INVENTION

Ground crew members maneuvering an aircraft using a motored vehicle, or tug, may have difficulty in being aware of potential collisions of portions of the aircraft with other objects as they are moving the aircraft. The difficulty arises in part, due to limited visibility caused by the relatively large size of the aircraft and or the tow tug, and due to potential distractions, such as other moving vehicles or ground crew members.

If a land-based ground object is in the way of the towed aircraft, the wing tips or tail of the towed aircraft may inadvertently collide with the ground object. Examples of ground objects include, but are not limited to, a hangar or other building, a lighting pole, a vehicle, or a fence. In some situations, the wing tips or the tail of the towed aircraft may inadvertently collide with a nearby stationary aircraft. Also of concern is the potential collision of the engine cowling with objects on the ground which may not be visible to the ground crew members while towing the aircraft. Such inadvertent collisions of the towed aircraft may be costly to repair, and may render the aircraft as unsuitable for flight for an undesirable period of time. Accordingly, there is a need in the arts to reduce the number and/or severity of inadvertent collisions of the towed aircraft with ground objects.

SUMMARY OF THE INVENTION

The present invention provides a towing collision-avoidance system for members of a ground crew. An example embodiment includes a plurality of radar sensor modules that each emits from a radar emitter a radar signal, receives at a radar detector radar return signals corresponding to reflections of the emitted signal from a ground object, and transmits radar information associated with the received radar signal reflections reflected from the ground object, wherein each of the plurality of radar sensor modules are uniquely located on a surface of an aircraft that is at risk for collision with a ground object while the aircraft is being towed; a gateway unit that receives the radar information transmitted from the radar sensor module and transmits information associated with the received radar information; and a ground crew alert indicator that receives the information transmitted by the gateway unit and that presents a graphical alert icon on a display. The display is viewable by at least one member of a ground crew that is towing the aircraft. The presented graphical alert icon indicates a likelihood of collision between the aircraft and the ground object. The presented graphical alert icon indicates a location on the aircraft of the collision between the aircraft and the ground object.

BRIEF DESCRIPTION OF THE DRAWINGS

Preferred and alternative embodiments of the present invention are described in detail below, with reference to the following drawings.

DETAILED DESCRIPTION OF THE INVENTION

Figure 1:
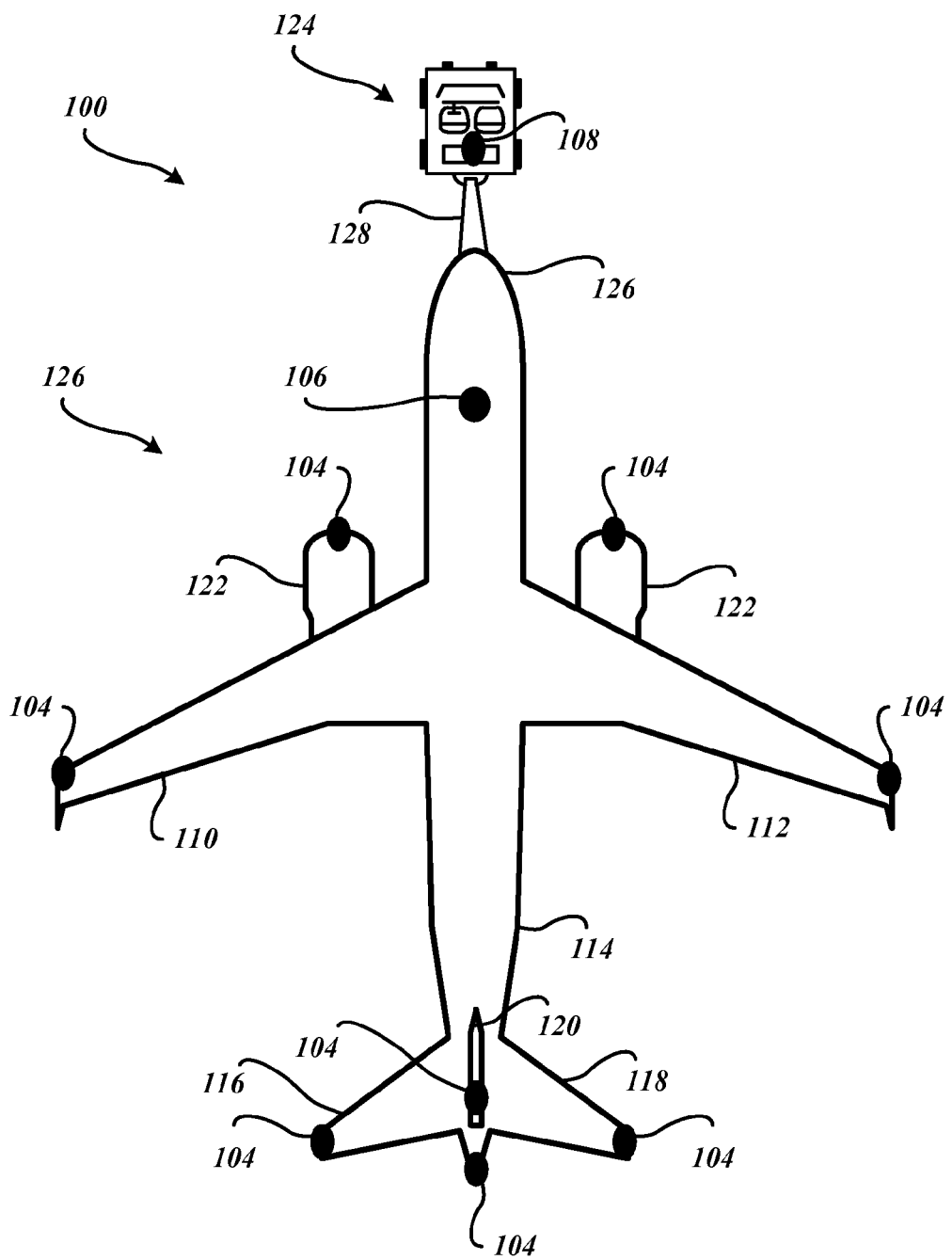
FIG. 1 is a view of an embodiment of an exemplary ground crew collision-avoidance system embodied in an aircraft.

FIG. 1 is a view of an embodiment of an exemplary ground crew collision-avoidance system 100 embodied in an aircraft 102. The ground crew collision-avoidance system 100 includes radar sensor modules 104 (e.g., a radar emitter/detector device) located on the exterior of the aircraft at selected locations that may be at risk for collision with a ground object while the aircraft 102 is being towed by a ground crew.

During the towing of the aircraft 102 by the ground crew, the radar sensor modules 104 emit radar signals. If a radar signal return from a ground object is detected by one or more of the radar sensor modules 104, a determination is made of the likelihood of collision, or the potential of the risk of collision, of that the portion of the aircraft 102 where the detecting radar sensor modules 104 is located. In an example embodiment, radar information is sent to a gateway unit 106 which performs the processing of the detected radar return signals to determine the likelihood of collision, or the potential of the risk of collision. Then, an alert, such as a warning or an alarm, is communicated to at least one ground crew alert indicator 108.

In the various embodiments, the ground crew alert indicator 108 includes a display configured to present a graphical alert icon that is visible to at least one member of the ground crew engaged in moving the aircraft 102. The graphically presented alert icon imparts visual information to the ground crew member indicating a potential risk of collision of the aircraft 102 with the ground object. Further, the alert icon is presented at a location on the display so as to indicate a location of the potential impact of the aircraft 102 with the ground object. Upon issuance of the graphical alert icon from the ground crew alert indicator 108, the ground crew members may make a suitable evasive maneuver to avoid collision with the detected object.

In some embodiments, the radar sensor modules 104 are implemented in aircraft light units that are also configured to emit visible or non-visible light for a variety of purposes. Typically, such aircraft light units are located at extremities of the aircraft 102. These aircraft extremities are likely to collide with various types of ground objects. Such aircraft lights may be colored navigation/position lights or anti-collision lights that emit colored light understood by others to be a warning signal. Other embodiments of the radar sensor modules 104 may be dedicated units that are installed on the exterior surface of the aircraft 102.

As illustrated in FIG. 1, a plurality of radar sensor modules 104 are at various locations on the aircraft 102. For example, radar sensor modules 104 are located at the wing tips of the left wing 110 and the right wing 112 of the aircraft 102. Since the wingtips extend outward from the fuselage 114 of the aircraft 102, detection of a ground object in proximity to these radar sensor modules 104 may be used to assess the likelihood of a collision of the wings 110, 112 with the detected ground object as the ground crew members are towing the aircraft 102 in a forward or a backward direction, and/or are towing the aircraft 102 during a turning maneuver.

Similarly, a plurality of radar sensor modules 104 may be located at the rear of the aircraft 102, such as at the tips of the left tail 116 and the right tail 118, and/or at the very end of the fuselage 114. Since the tails (horizontal stabilizers) extend outward from the fuselage 114 at the rear of the aircraft 102, detection of a ground object in proximity to these radar sensor modules 104 may be used to assess the likelihood of a collision of the tails 116, 118 with a detected ground object as the ground crew is towing the aircraft 102 in backward directions, and/or are towing the aircraft 102 during a turning maneuver. Similarly, since the end of the fuselage 114 is the farthest extent of the aircraft 102, detection of an object may also provide a useful indication of a potential collision with the ground object.

A radar sensor module 104 may be located at the upper extent of a vertical stabilizer 120. Since the vertical stabilizer 120 extends upward from the fuselage 114 at the rear of the aircraft 102, and is typically the highest portion of the aircraft 102, detection of a ground object in proximity to this radar sensor module 104 may be used to assess the likelihood of a collision of the vertical stabilizer 120 with the detected ground object as the ground crew is towing the aircraft 102 in a forward or a backward direction. For example, the ground crew may be towing the aircraft 102 into a covered hangar. The radar sensor module 104 at the vertical stabilizer 120 would provide an alert or warning if there was insufficient height clearance for the vertical stabilizer 120 of the aircraft 102 to enter into the covered hangar.

Similarly, a plurality of radar sensor modules 104 may be located at the lower extent of the cowlings of the aircraft engines 122. Detection of a low height object on the ground in proximity to these radar sensor modules 104 may be used to assess the likelihood of a collision of the aircraft engines 122 with the detected ground object. Such low height ground objects may be difficult to see, such as when the ground crew is towing the aircraft in a backwards direction and the low height ground object is blocked from view by the aircraft's landing gear structure from a tow tug 124.

Typically, the tow tug 124 couples to the landing gear structure at the forward portion, or nose 126, of the fuselage 114 of the aircraft 102. A tow structure 128 couples the tow tug 124 to the aircraft 102 so as to extend out the tow tug 124 from the aircraft 102, thereby improving visibility for the ground crew operator of the tow tug 124. The extension of the tow tug 124 out from the aircraft 102 also maintains a margin of space for safety purposes.

Figure 2:
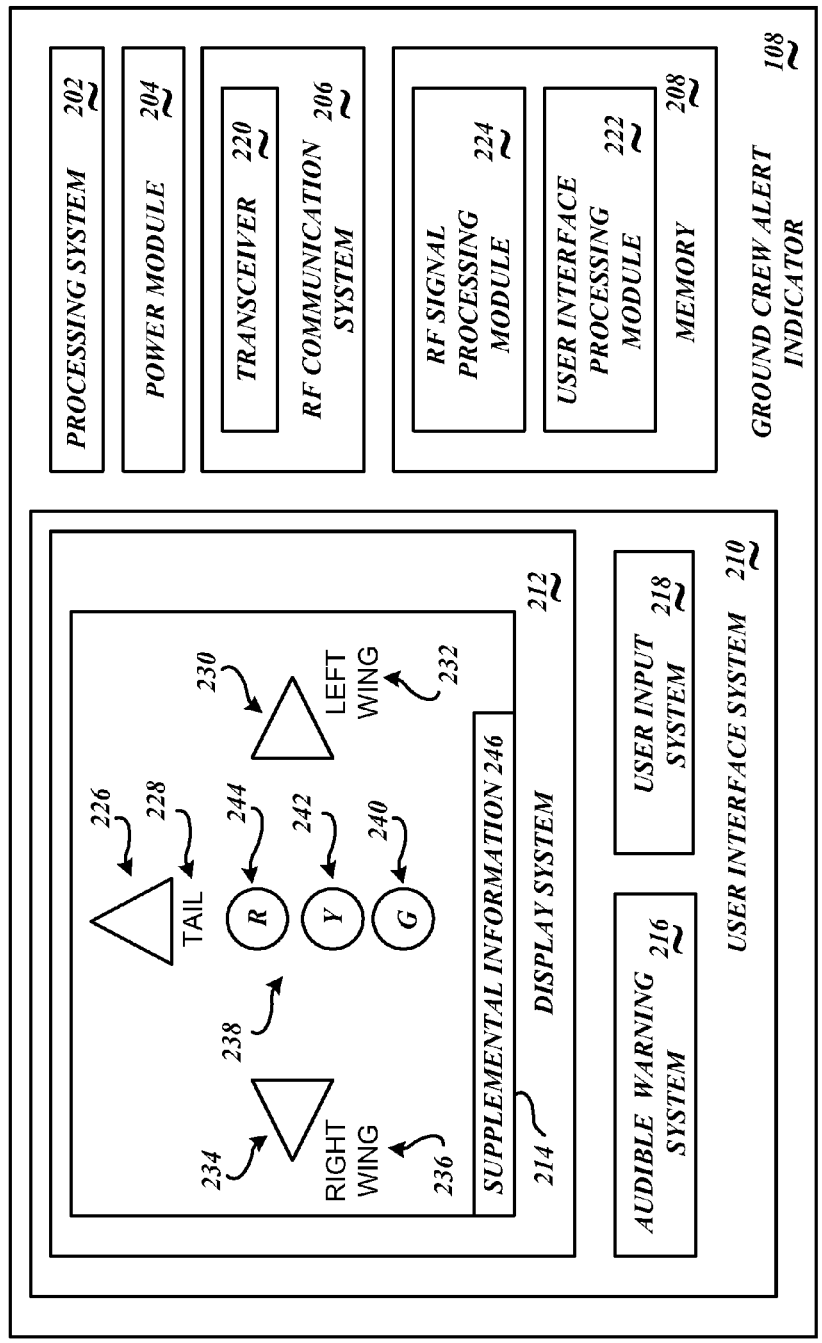
FIG. 2 is a block diagram of an embodiment of an exemplary ground crew alert indicator.

FIG. 2 is a block diagram of an embodiment of an exemplary ground crew alert indicator 108. The ground crew alert indicator 108 comprises a processing system 202, an optional power module 204, an optional radio frequency (RF) communication system 206, an optional memory 208, and a user interface system 210. The user interface system 210 comprises a display system 212 with a display 214, an optional audible warning system 216 and an optional user interface 218. The RF communication system 206 comprises at least a transceiver 220. The memory 208 comprises portions for storing the user interface processing module 222 and the RF signal processing module 224

The processing system 202 may be any suitable processor or device. The processing system 202 may be a commercially available processor. In other embodiments, the processing system 202 may be a firmware implementation. The processing system 202 may be a specially designed and fabricated processor.

Other components may be optionally included in the ground crew alert indicator 108. Alternatively, one or more of the components of the example ground crew alert indicator 108 may reside in other convenient locations, such as when the ground crew alert indicator 108 is integrated into the dashboard of the tow tug 124.

In some embodiments, the processing system 202 may process the radar return signal information received from the gateway unit 106 into information corresponding radar information that identifies the location of and/or distance (range) from the portion of the aircraft (having the detecting radar sensor module 104) and the detected ground object. In other embodiments, the ground crew alert indicator 108 is configured to directly receive radar sensor information from the individual radar sensor modules 104.

Alternatively, some embodiments of the gateway unit 106 may process the radar return signal information received from the radar sensor modules 104 into information that identifies the location of and/or range from the portion of the aircraft (having the detecting radar sensor module 104) and the detected ground object. In such embodiments, the gateway unit 106 determines the appropriate alert control signals that are communicated to the ground crew alert indicator 108. Accordingly, the ground crew alert indicator 108 simply issues the commanded alert. Such embodiments may be useful when a plurality of ground crew alert indicators 108 are deployed, such as when one of the ground crew alert indicators 108 is installed on or integrated into the tow tug 124 and one or more other ground crew alert indicators 108 are portable hand held devices carried by the ground crew members.

In an example embodiment, the ground crew alert indicator 108 is configured to receive the radar return signal information from the gateway unit 106 and/or the radar sensor modules 104 via RF signals. The processing system 202, executing the RF signal processing module 224, processes the radar return signal information in a received RF signal into information that is suitable for processing by the processor 202. Other embodiments may be configured to receive information from the gateway unit 106 and/or the radar sensor modules 104 using any suitable communication medium, including other wireless mediums or a wire-based medium.

In such RF communication-based embodiments, the RF signals may be encrypted for security purposes. Alternatively, or additionally, identifiers of the aircraft 102 and/or the ground crew alert indicators 108 may ensure that only the towed aircraft 102 is providing information to the ground crew members that are currently towing the aircraft 102.

In the various embodiments, the transceiver 220 is a receiver device configured to receive RF signals from the gateway unit 106 or another device. For example, software updates or software modifications to the user interface processing module 222 and/or the RF signal processing module 224 may be received from time to time. In other embodiments, the transceiver 220 may also be a transmitter device configured to transmit RF signals to the gateway unit 106 or to another device. For example, confirmation of the issuance of an alert may be transmitted to verify that the ground crew has been notified of a potential collision with a detected ground object.

The power module 204 may be included to provide power to one or more of the components of the ground crew alert indicator 108. In some situations, current and/or voltage requirements of the components of the ground crew alert indicator 108 may be different from the power (voltage and/or current) provided by the power supply of the tow tug 124 or by batteries installed in the ground crew alert indicator 108. Accordingly, the power module 204 may be configured to condition the received power, such as by changing the voltage and/or current characteristics of the received power. For example, embodiments of the power module 204 may include transformers, DC/DC voltage converters, and/or DC/AC converters. Any suitable power module 204, and/or suitable components, may be used.

The user input system 218 may comprise a plurality of controllers, such as buttons, dials or the like, to control various operational characteristics of the ground crew alert indicator 108. The processing system 202, executing the user interface processing module 222, may implement the user modifications to these operating characteristics. In some embodiments, the display 214 may be a touch sensitive screen wherein the controllers are shown as adjustable graphical icons or the like.

In an example embodiment, a controller may be configured to adjust a lighting intensity of the display 214 so that display light output intensity can be adjusted based on current ambient lighting conditions. As another example, a controller may be configured to adjust volume of an output audible warning or alarm so that the output sound may be adjusted for background noise levels.

FIG. 2 illustrates an example graphical user interface (GUI) alert presentation on the display 232 of the ground crew alert indicator 108. A system of illuminated alert icons is configured to quickly impart information to the ground crew members as an alert (a warning or an alarm) that the aircraft 102 may potentially collide with a detected ground object. The imparted visible alert information is readily understood by the ground crew members. The size and location of the display 214 is such that a presented alert icon is readily discernable by the ground crew members while they are in the process of towing the aircraft 102.

In the example GUI alert shown on the display 214, a tail alert icon 226 is shown as an example alert icon. The tail alert icon 226 corresponds to the geographic location of the rear portion of the aircraft 102. A alpha numeric identifier, such as the text "TAIL" 228, may also be optionally included as part of the alert icon to further clarify that the tail alert icon 226 is associated with the rear portion of the aircraft 102. Any suitable text may be used.

In the event that one or more of the radar sensor modules 104 (located at the tips of the left tail 116 and the right tail 118, at the very end of the fuselage 114, and/or at the upper extent of the vertical stabilizer 120) are not detecting presence of a ground object, the tail alert icon 226 may not be illuminated, or may be illuminated at a relatively low level.

In some embodiments, the tail alert icon 226 may be illuminated with a particular color. For example, a green illumination color may indicate that the rear portion of the aircraft 102 is not near any ground objects. A yellow illumination color may indicate that the rear portion of the aircraft 102 is nearing a ground object and that there is a potential of collision with the detected ground object. The yellow illumination color may be interpreted as a type of warning or the like. A red illumination color may indicate that the rear portion of the aircraft 102 is nearing a ground object and that there is a high likelihood of collision with the detected ground object in the absence of an evasive maneuver. The red illumination color may be interpreted as a warning.

Additionally, or alternatively, the tail alert icon 226 may be illuminated with a particular intensity. For example, a low illumination intensity may indicate that the rear portion of the aircraft 102 is not near any ground objects. A relatively moderate illumination intensity may indicate that the rear portion of the aircraft 102 is nearing a ground object and that there is a potential for collision with the detected ground object. The moderate illumination intensity may be interpreted as a type of warning or the like. A high illumination intensity, and/or a flashing illumination, may indicate that the rear portion of the aircraft 102 is nearing a ground object and that there is a high likelihood of collision with the detected ground object in the absence of an evasive maneuver. The high illumination intensity may be interpreted as a warning.

In the example GUI presented in FIG. 2, a left wing alert icon 230 and an optional alpha numeric identifier, such as the text "LEFT WING" 232, are shown as an example alert icon. Similarly, a right wing alert icon 234 and an optional alpha numeric identifier, such as the text "RIGHT WING" 236, may be included to indicate a warning or alarm that is associated with a potential collision of the right wing 112 with a detected ground object. Any suitable text may be used.

These wing alert icons 230, 232 indicate a warning and/or an alarm that is associated with a potential collision of the left wing 110 or right wing 112, respectively, with a detected ground object. The detection of the ground object may be made by one or more radar sensor modules 104, such as the example radar sensor module 104 located at the wingtip of the left wing 110 and/or the example radar sensor module 104 located at the wingtip of the right wing 112. The presented colors and/or intensities of the left wing alert icon 230 and the right wing alert icon 234 may be similar to the presentation colors and/or intensities described above for the tail alert icon 226.

Further, the relative presentation location of the tail alert icon 226, the left wing alert icon 230, and the right wing alert icon 234 on the display 214 are associated with the physical extents of the aircraft 102 that are at risk of collision with a detected ground object. For example, by observing that the presentation location of the left wing alert icon 230 is on the right side of the display 214, the ground crew members readily appreciate the location of the potential collision relative to the indicated portion of the aircraft 102.

In some embodiments, a plurality of supplemental alert indicator icons 238 are included to assist visually impaired ground crew members, such as those who may be color blind. In this exemplary embodiment, three supplemental alert indicator icons 238 are aligned in a vertical row, and intuitively are arranged as a well known stop light.

Accordingly, a first supplemental alert indicator icon 240 is located at the lower position of the three supplemental alert indicator icons 238. The first supplemental alert indicator icon 240 may be colored green and/or may have indicating text, such as the example "G" for green. The first supplemental alert indicator icon 240 indicates that the aircraft 102 is presently free from potential collision with any nearby ground objects. The first supplemental alert indicator icon 240 may be brightly illuminated so that a color-blind ground crew member will readily understand that no warning or alarm is being issued by the ground crew alert indicator 108.

A second supplemental alert indicator icon 242 is located at the middle position of the three supplemental alert indicator icons 238. The second supplemental alert indicator icon 242 may be colored yellow and/or may have indicating text, such as the example "Y" for yellow or caution. The second supplemental alert indicator icon 242 indicates that the aircraft 102 may be at risk of a potential collision with one or more ground objects. The second supplemental alert indicator icon 242 may be brightly illuminated so that a color-blind ground crew member will readily understand that a warning type alert is being issued by the ground crew alert indicator 108. Further, the color blind ground crew member may readily determine the location of the potential collision on the aircraft by observing the output intensity of the tail alert icon 226, the left wing alert icon 230, or the right wing alert icon 234. For example, if the second supplemental alert indicator icon 242 and the left wing alert icon 230 are brightly illuminated, the color-blind ground crew member will readily understand that a warning or alert is being issued for a potential collision of the left wing 110 with a detected ground object.

A third supplemental alert indicator icon 244 is located at the upper position of the three supplemental alert indicator icons 238. The third supplemental alert indicator icon 244 may be colored red and/or may have indicating text, such as the example "R" for red or high warning. The third supplemental alert indicator icon 244 indicates that the aircraft 102 may be at imminent risk of a collision with one or more ground objects. The third supplemental alert indicator icon 244 may be brightly illuminated and/or may be flashing so that a color-blind ground crew member will readily understand that an alarm is being issued by the ground crew alert indicator 108. Further, the color blind ground crew member may determine the location of the potential collision on the aircraft 102 by observing the output intensity and/or flashing nature of the tail alert icon 226, the left wing alert icon 230, or the right wing alert icon 234. For example, if the third supplemental alert indicator icon 244 and the tail alert icon 226 are brightly illuminated, the color-blind ground crew member will readily understand that an alarm type alert is being issued for an imminent collision of the tail portion of the aircraft 102 with a detected ground object.

In some embodiments, presentation of the supplemental alert indicator icons 240, 242, 244 is selectable such that the supplemental alert indicator icons 240, 242, 244 are presented only when a color blind or otherwise visually impaired ground crew member is being alerted. For example, an input via the user input system 218 may selectively activate or deactivate presentation of the supplemental alert indicator icons 240, 242, 244.

In some embodiments, an audible warning system 216 may be included with presentation of one or more alert icons by the ground crew alert indicator 108. The audible warning system 216 may be configured to issue an audible warning or alert to the ground crew moving the aircraft 102 in the event that any obstacles or hazards (ground objects) are within a detection range of the radar sensor modules 104. The audible warning system 216 may issue any suitable audible warning or alarm. The audible alert may comprise a beeping or tonal sound. The volume of the audible alert may be adjusted depending upon the likelihood of collision with a detected ground object, and thus be coordinated with the color and/or illumination intensity of the presented tail alert icon 226, the left wing alert icon 230, the right wing alert icon 234, and/or the supplemental alert indicator icons 238. Volume levels for an audible alert may be louder for an alarm type alert than a warning type alert.

The ground crew alert indicator 108 may be provisioned in a variety of forms. In an example embodiment, the ground crew alert indicator 108 is installed as a separate module on the tow tug 124. The ground crew alert indicator 108 is located in a visible location to the operator of the tow tug 124. For example, the ground crew alert indicator 108 may be located at the rear of the tow tug 124. Alternatively, or additionally, the ground crew alert indicator 108 may be located at the front of the tow tug 124. Alternatively, or additionally, the ground crew alert indicator 108 may be integrated with other indicators of the tow tug 124, such as on the dashboard of the tow tug 124 or as a heads up type display on a window of the tow tug 124.

In some embodiments, the ground crew collision-avoidance system 100 may be mounted on or near the front landing gear structure located near the nose portion 126 of the fuselage 114. In such embodiments, the ground crew alert indicator 108 is always with the aircraft 102, and may be used at any airport that the aircraft 102 is currently at. Further, if various models of the ground crew alert indicator 108 are used in the aircraft industry, the ground crew alert indicator 108 installed on the particular aircraft 102 will inherently be compatible with the gateway unit 106 and the radar sensor modules 104 of that aircraft 102.

Some embodiments of the ground crew alert indicator 108 may be hand held. The ground crew alert indicator 108 may be a separate hand held device that may be carried by one or more of the ground crew members. Alternatively, or additionally, the ground crew alert indicator 108 may be affixed to or secured on the ground crew member using a clip or strap. For example, but not limited to, the ground crew alert indicator 108 may be similar to a wrist band watch. Alternatively, or additionally, the ground crew alert indicator 108 may be integrated with another device. For example, but not limited to, the ground crew alert indicator 108 may be included as part of a signal baton or the like.

Other supplemental information 246 may be presented on the display 214. Such supplemental information may be presented as alpha numeric information. For example, the supplemental information 246 may indicate the current time, day and/or date. Alternatively, or additionally, the supplemental information 246 may indicate an aircraft identifier or a destination that the aircraft 102 is being moved to. Alternatively, or additionally, the supplemental information 246 may present messages communicated from another party or device. For example, the operators in the control tower may wish to communicate a message to the ground crew, and accordingly, may communicate their message to the ground crew alert indicator 108. Any suitable supplemental information 246 may be presented on the display 214.

Figure 3:
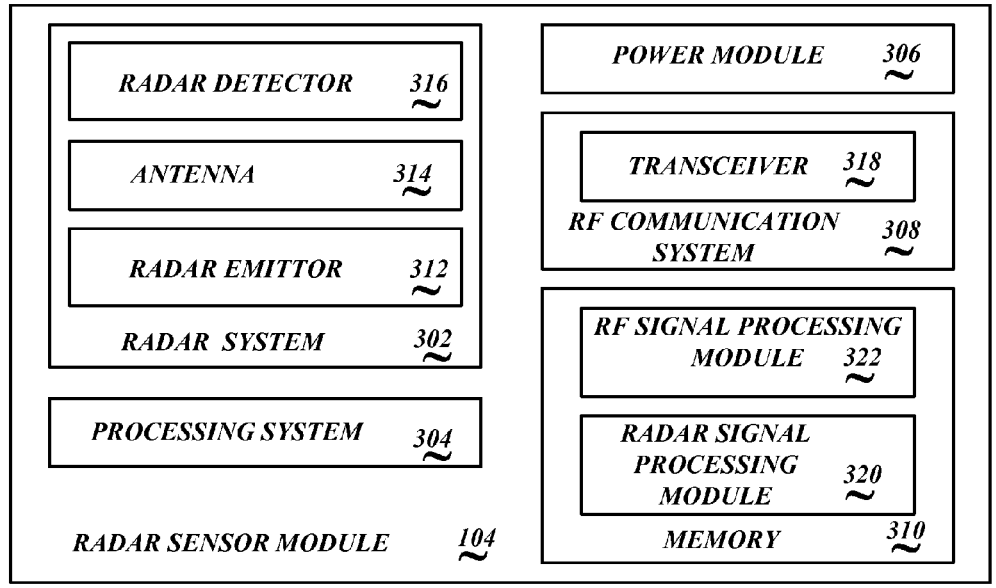
FIG. 3 is block diagram of an example embodiment of a radar sensor module.

FIG. 3 is block diagram of an example embodiment of a radar sensor module 104. The radar sensor module 104 comprises a radar system 302, a processing system 304, an optional power module 306, a radio frequency (RF) communication system 308, and an optional memory 310. The radar system 302 comprises a radar emitter 312, an antenna 314, and a radar detector 316. The RF communication system 308 comprises at least a transceiver 318. In some embodiments, the transceiver 318 may be limited to a suitable RF transmitter device. The memory 310 comprises portions for storing a radar signal processing module 320 and an RF signal processing module 322.

The processing system 304 may be any suitable processor or device. The processing system 304 may be a commercially available processor. In other embodiments, the processing system 304 may be a firmware implementation. The processing system 304 may be a specially designed and fabricated processor.

Other components may be optionally included in the radar sensor module 104. In an example embodiment, the radar sensor module 104 is integrated into an aircraft light module (fixture). Since aircraft lights may be located at the various farthest extents of the aircraft 102, the radar sensor modules 104 will be located at the closest anticipated points of collision with ground objects. Alternatively, one or more of the components of the example radar sensor module 104 may reside in other convenient locations of the aircraft 102, and may even be a stand-alone device that is mounted or affixed to the exterior surface of the aircraft at any suitable location of interest.

A new generation of high intensity light emitting diode (LED) lamps are becoming increasingly available for aircraft lighting applications. Because of the relatively small size of the LEDs, in comparison to traditional incandescent or other types of lamps used in traditional aircraft light modules, vacant space or room in the light module may be available. In the various embodiments, a radar sensor and other electronic devices are incorporated into the light module to form a radar sensor module. The light fixture-based radar sensor module is designed to fixably couple to an existing light module receptacle on the exterior surface of the aircraft 102.

Further, the radar sensor module 102 may be further configured to communicate radar information using a radio frequency (RF) medium or other suitable wireless signal medium. The RF communication system 308 generates and transmits a RF signal that is received by the gateway unit 106. In some embodiments, the transceiver 318 is a RF transmitter that transits, or communicates, the radar return signal information for a distance that is at least detectable by the gateway unit 106. In other embodiments, the transceiver 318 is configured to receive RF signals from the gateway unit 106 or another device. For example, software updates or software modifications to the radar signal processing module 320 and/or the RF signal processing module 322 may be received from time to time.

Such RF signal-based embodiments are particularly suitable to retrofits for existing aircraft 102. Further, since no additional wiring or structural modifications (or at least minimal wiring or structural modifications) are required to add the ground crew collision-avoidance system 100 to a legacy aircraft 102, regulatory review and approval for modifications to the aircraft 102 may be avoided, or at least mitigated.

The radar emitter 312 is configured to generate the radar signals which are emitted from the antenna 314 in a direction of interest. The antenna 314 is further configured to receive radar return signals that may be reflected from any ground objects that are within a detection range of the radar emitter 312. The radar detector 316 receives the radar return signals from the antenna 314 and processes the received radar return signals into radar return signal information. The radar return signals are associated with reflections of the emitted radar signal that are reflected from a nearby ground object.

The processing system 304 is configured to receive the radar return signal information from the radar detector 316. In some embodiments, the processing system 304, executing the radar signal processing module 320, may further process the radar return signal information into information corresponding radar information that identifies the location of and/or range to any detected ground objects. The processing system 304, executing the RF signal processing module 322, processes the radar return signal information into information that is suitable for communicating in a RF signal by the RF communication system 308.

The power module 306 may be included to provide power to one or more of the components of the radar sensor module 104. Is some situations, current and/or voltage requirements of the components of the radar sensor module 104 may be different from the power (voltage and/or current) provided to illuminate the LEDs of an aircraft light having the radar sensor module 104 therein. The power module 306 is configured to receive a sufficient amount of power from the aircraft 102, preferably using existing power supply components and connectors in the case of a retrofit application. The power module 306 may also be configured to condition the received power, such as by changing the voltage and/or current characteristics of the received power. For example, embodiments of the power module 306 may include transformers, DC/DC voltage converters, and/or DC/AC converters. Any suitable power module 306, and/or suitable components, may be used.

The aircraft light module having the radar sensor module 104 therein preferably comprises a plurality of connectors which may be easily decoupled from mating connectors of a corresponding coupling unit on the aircraft 102 during replacement of the aircraft light module. One or more of the connectors in the coupling unit 218 are configured to receive power for lighting of the LEDs or other types of lamps. In an example embodiment, when the aircraft light module is turned on (actuated) during taxiing or the like, the radar sensor module 104 receives power and becomes operational. When the aircraft light module is off (deactivated), then power is not provided to the radar sensor module 104, and is thus not operational.

In other embodiments, power is continuously available over the power connection. Control signals are provided to the aircraft light module which causes illumination of the aircraft light module LEDs. In such embodiments, power is continuously available to the radar sensor module 104. In some embodiments, the radar sensor module 104 is continuously operational, and is therefore detecting for the presence of any obstacles or hazards that are within a detection range of the radar emitter 312.

In other embodiments, the ground crew or other operator provides a control signal that causes the radar sensor module 104 to become operational. Alternatively, or additionally, the control signal that causes the radar sensor module 104 to become operational is provided by another electronic system or electronic device, such as, but not limited to, as controller associated with a device that is used for towing the aircraft 102.

In the various embodiments, the orientation of the radar emitter 312 is selected so that the emitted radar signals are emitted in a direction of interest, or field of view (FOV) that is associated with the possible occurrence of a collision with a ground object. For example, the radar emitter 312 when located at the tips of the wings 110, 112, may be oriented along a horizontal plane to detect presence of objects at the same height of the wings 110, 112. In some embodiments, the radar emitter 312 may also be oriented in a forward-looking direction so as to sense objects that are in front of the wings 110, 112. Alternatively, or additionally, the radar emitter 312 may also be oriented in a backward-looking direction so as to sense objects that are behind the wings 110, 112. In some embodiments, multiple radar emitters 312 may be used to provide radar coverage about an area of interest. For example, but not limited to, two radar emitters 312 may be employed, one oriented in a forward direction, and one oriented in a backward direction. Embodiments of the radar sensor modules 104 may employ any desired number of radar emitters 312. Further, embodiments may include any suitable number of antennas 314 and/or radar detectors 316 necessary to emit radar signals, and to receive and detect radar reflections.

The fields of view (FOVs) of the radar sensor modules 104 provide a desired coverage of a region of space around the aircraft 102. The FOV parameters are derived from typical accident geometry and functional requirements. Any blind spots surrounding the aircraft 102 are based on the FOV of one candidate technology (radar) and constraints associated with placing the radars inside the light modules. Other FOVs are possible, depending upon where the radar system 302 is placed within the light module.

The thresholds for sensor FOVs may be assessed based on the particular region of space required for the landing of the aircraft 102. Further, sensor FOVs may be defined based on regulatory requirements which specify a minimum distance threshold from hazards or obstacles during the movement of the aircraft 102.

In an example embodiment, the radar sensor module 104 and the gateway unit 106 include OneWireless™ devices produced by Honeywell, Inc. and adapted to CAS system requirements. Special antennas are used with these devices to ensure proper link power budget. Other wireless protocols may be used, such as 802.11 (WLAN) radio technology.

Figure 4:
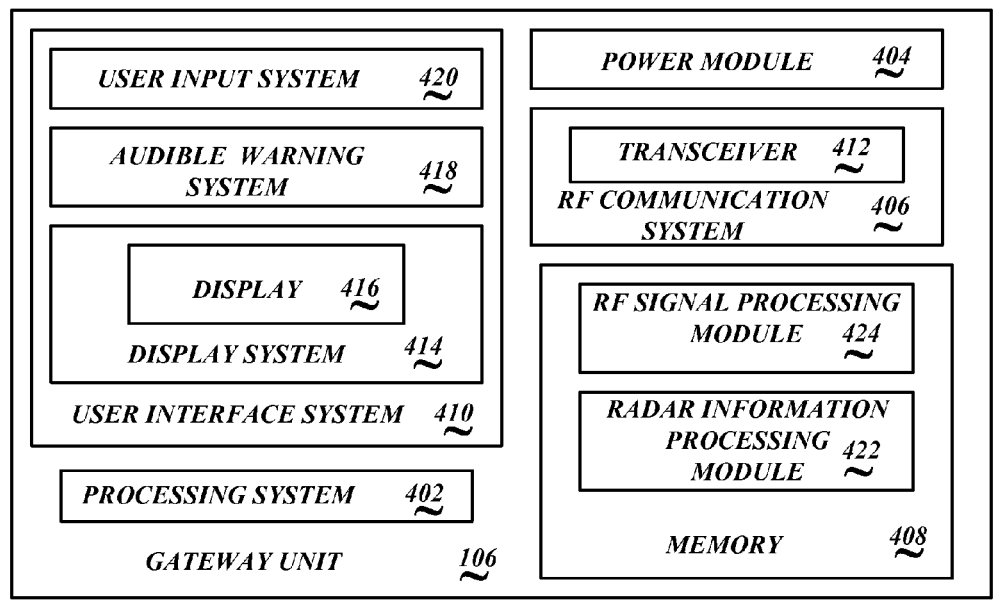
FIG. 4 is block diagram of an example embodiment of a gateway unit.

FIG. 4 is block diagram of an example embodiment of a gateway unit 106. The gateway unit 106 comprises a processing system 402, a power module 404, a RF communication system 406, a memory 408, and an optional user interface system 410. The RF communication system 406 comprises a transceiver 412. The user interface system 410 comprises a display system 414 with an optional display 416, an optional audible warning system 418, and an optional user input 420. The memory 408 comprises portions for storing the radar information processing module 422 and the RF signal processing module 424.

The processing system 402 may be any suitable processor or device. The processing system 402 may be a commercially available processor. In other embodiments, the processing system 402 may be a firmware implementation. The processing system 402 may be a specially designed and fabricated processor. In some embodiments, the processing system 402 may be a component of another system or device which receives the radar information from the radar sensor modules 104 or from the RF communication system 406.

Other components may be optionally included in the gateway unit 106. Alternatively, one or more of the components of the example gateway unit 106 may reside in other convenient locations within the aircraft 102.

In an example embodiment, the RF communication system 406 receives the RF signals transmitted by the radar sensor modules 104. In such embodiments, the transceiver 412 is a RF receiver that receives the communicated radar return signal information for a distance that is at least within the broadcast range of the radar sensor modules 104. In the various embodiments, the transceiver 412 may be configured to transmit RF signals to the radar sensor module 104 or another device. For example, updates or modifications to the radar information processing module 422 and/or the RF signal processing module 424 in the radar sensor modules 104 may be transmitted from time to time.

In a wire-based embodiment that is configured to receive radar information from one or more of the radar sensor modules 104 using a wire-based communication media, the example RF communication system 406 may be replaced with a suitable wire-based communication system. Some embodiments may be configured to receive both RF signals and wire-based signals for the radar sensor modules 104 and/or from other devices.

The processing system 402, executing the RF signal processing module 424, processes the RF signal information received from the radar sensor module 104 into radar information. The processing system 402, executing the radar information processing module 422, further processes the radar information into alert information that is suitable for communicating to the ground crew alert indicator 108.

In some embodiments, the optional user interface system 410 may be used to provide warning and/or advisories of any detected obstacles or hazards that are within a detection range of the radar sensor modules 104. For example, the gateway unit 106 may be located in the cockpit of the aircraft 102. In such an embodiment, the processing system 402 generates graphical display information that is presentable on the optional display 416. The graphical information presented on the display 416 may be similar to the view provided by the ground crew alert indicator 108. Accordingly, the crew viewing the display 416 appreciates the nature of any detected obstacles or hazards that are within a detection range of the radar sensor modules 104 as their aircraft is being taxied or otherwise moved by the ground crew members. Thus, the crew of the aircraft 102, if present during towing, will receive the same alerts as the ground crew members.

Alternatively, or additionally, graphical display information may be communicated to a remote display, and/or may be communicated to another system. For example, the graphical display information may be communicated to an electronic flight bag or the like. Alternatively, or additionally, the graphical display information may be communicated to an onboard radar system.

In some embodiments, the audible warning system 418 may be configured to issue an audible warning or alert to the crew of the aircraft 102 in the event that any objects are within a detection range of the radar sensor modules 104. The audible warning system 418 may be located at a convenient location within the cabin of the aircraft 102. In other embodiments, a signal may be communicated to another audible warning system so that an audible alert or warning may be issued.

The user input system 420 is configured to receive input from the crew of the aircraft 102 or by another individual, such as the maintenance crew. In some embodiments, the user input system 420 may be used to input a command that actuates the operation of the gateway unit 106, one or more of the radar sensor modules 104, and/or one or more of the ground crew alert indicators 108. Additionally, or alternatively, the crew may set and/or adjust a distance threshold that is used to generate alerts in the event that any obstacles or hazards that are within a distance threshold from the aircraft 102.

The optional power module 404 provides power to the components of the gateway unit 106. When the aircraft 102 is retrofitted with an embodiment of the ground crew collision-avoidance system 100, a single and conveniently accessible source of power on the aircraft 102 may be provided to the power module 404. The power module 404 may then provide power to one or more of the components of the gateway unit 106.

Figure 5:
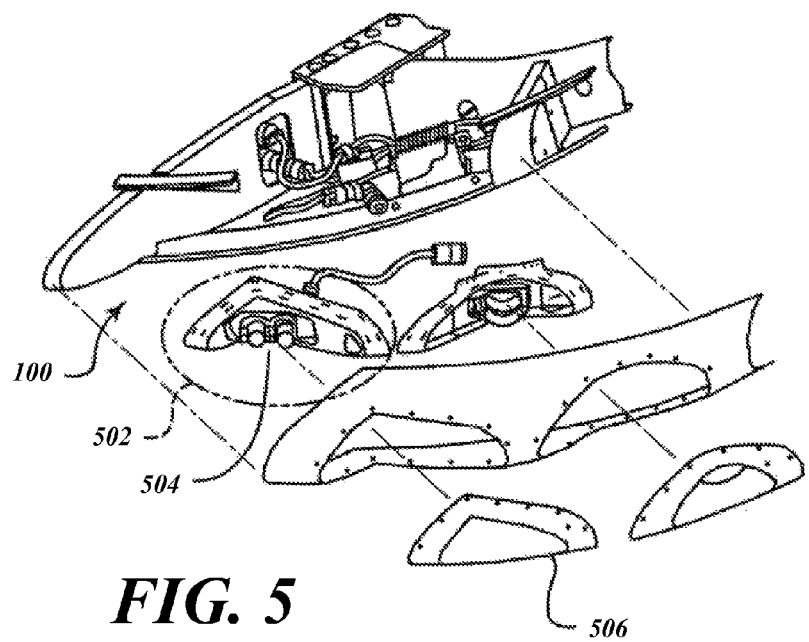
FIG. 5 shows an example light compartment of an example aircraft light with a radar sensor module.

In some situations, current and/or voltage requirements of the components of the gateway unit 106 may be different from the accessed power (voltage and/or current). In such instances, the power module 404 is configured to condition the received power, such as by changing the voltage and/or current characteristics of the received power. For example, embodiments of the power module 404 may include transformers, DC/DC voltage converters, and/or DC/AC converters. Any suitable power module 404, and/or suitable components, may be used as is understood by one skilled in the art FIG. 5 shows an example light compartment 502 of an example aircraft light with a radar sensor module 104 (not shown in FIG. 5), such as, but not limited to, the navigation/position light or an anti-collision light. The compartment 502 includes a position light 504 with two LED assemblies or two halogen bulbs (based on the lighting version requirements). The light compartment 502 includes:

Antenna—e.g., 2-4 cm. The antenna is located behind a glass cover 506; the other parts are made of aluminum or composites, which would increase signal attenuation.

radar sensor module 104 (not shown in FIG. 5) with an antenna mounted on or in the glass 506.

In example embodiments, the radar system 302 is an industrial, scientific, and medical (ISM) 2.4 GHz band and distance-measurement radar with related electronic gear. In one embodiment, a sensor node antenna for the ISM band wireless communication of the gateway unit 106 is included in the position-light compartment. In one embodiment, the antenna is placed under a light glass light cover, which is expected to be transparent for RF signal communication. The antenna also provides sufficient gain for the errorless communication with the gateway unit 106.

In some embodiments, a directional antenna is used. The directional antenna requires more space than omnidirectional dipoles do. Basically, there are at least two suitable directional antenna types, Yagi and patch antennas. Both provide directional characteristics, though any suitable antenna 314 may be used. The Yagi is flat and long in the direction of the main lobe; the patch antenna requires more space in the plane perpendicular to the main lobe axis. This means that Yagi antennas' front elements could interfere with the position light. On the other hand, the patch antenna requires more space between position-light components (LED reflectors, radar antenna lens).

Figure 6:
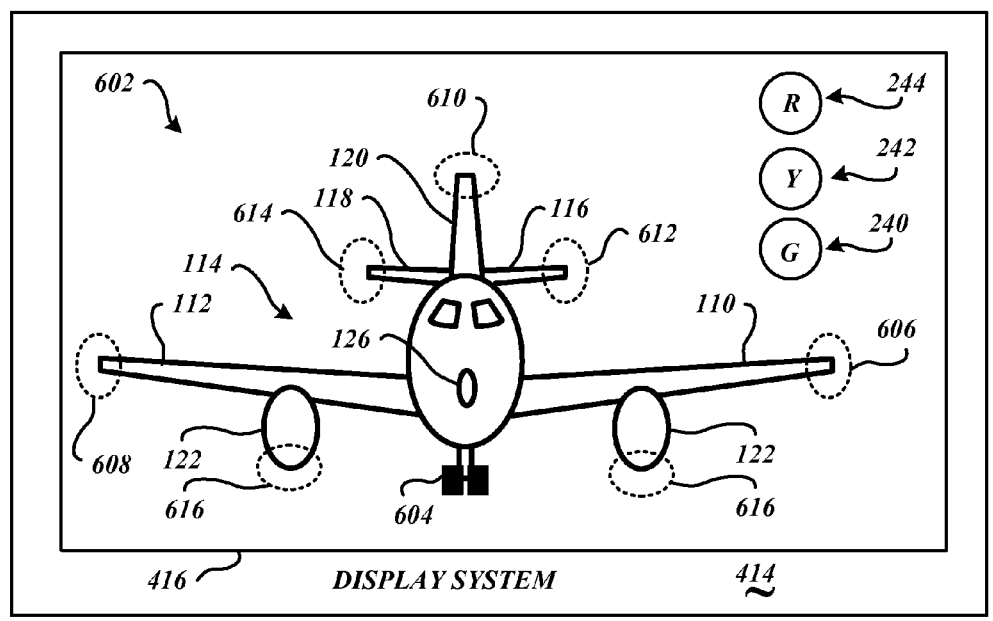
FIG. 6 illustrates an alternative graphical user interface presentation on the display of the ground crew alert indicator.

FIG. 6 illustrates an alternative graphical user interface presentation on the display 416 of the ground crew alert indicator 108. Here, a frontal end-on image 602 corresponding to the aircraft 102 is presented. The graphical representation of the aircraft 102 shows the left wing 110, the right wing 112, the left tail 116, the right tail 118, the vertical stabilizer 120, the nose 126 of the fuselage 114, and the engines 122. These portions of the aircraft are understood to be at-risk portions for collision with ground objects while the ground crew is towing the aircraft 102. Optionally, the graphical representation of the aircraft 102 may show a front landing gear structure 604 or other parts of the aircraft 102. Further, the above-described supplemental alert indicator icons 240, 242, 244 may be presented.

A left wing alert icon 606, illustrated by the enclosed dashed line region, may be included to indicate an alert that is associated with a potential collision of the left wing 110 with a detected ground object. Similarly, a right wing alert icon 608 may be included to indicate an alert that is associated with a potential collision of the right wing 112. A vertical stabilizer icon 610 may be included to indicate an alert that is associated with a potential collision of the top of the vertical stabilizer 120. Left and right tail alert icons 612 and 614, respectively, may be included to indicate an alert that is associated with a potential collision of the left tail 116 and the right tail 118, respectively. An engine cowling icon 616 may be included to indicate an alert that is associated with a potential collision of the bottom of the engines 122 with a detected object on the ground.

The alert icons 606, 608, 610, 612, 614, and 616 are illustrated as regions of the display 416 enclosed by a dashed line. Any suitable form of the alert icons may be used. In some embodiments, the alert icons are not visible when there is no detected ground object that might be collided with. In the event that a warning of a potential collision may occur, the alert icon may be illuminated using a yellow color and/or at a moderate intensity. In the event that an alarm of an imminent collision may occur, the alert icon may be illuminated using a red color and/or at a relatively high intensity (that is greater that the above described intensity associated with the yellow color). Accordingly, the ground crew member viewing a presented alert icon has a nearly immediate appreciation of the portion of the aircraft 102 that is at risk. In some embodiments, graphically presented alerts may be supplemented with an audible alert.

The supplemental alert indicator icons 240, 242, 244 are presented aligned in a vertical row may optionally be included to aid a color blind individual. In some embodiments, presentation of the supplemental alert indicator icons 240, 242, 244 is selectable such that the supplemental alert indicator icons 240, 242, 244 are presented only when a color blind or otherwise visually impaired ground crew member is being alerted.

Figure 7:
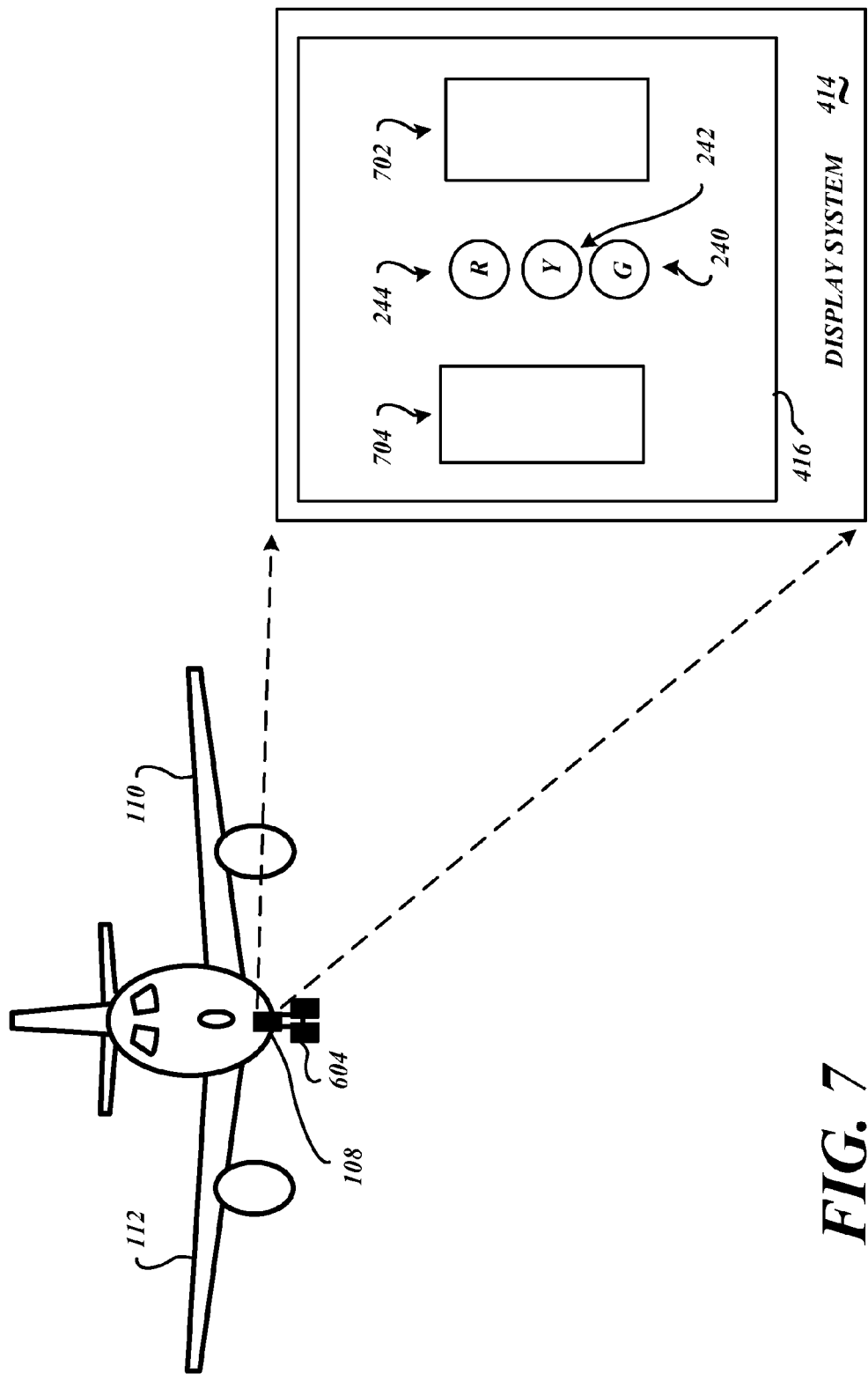
FIG. 7 illustrates an alternative graphical user interface presentation on the display of the ground crew alert indicator mounted on the landing gear structure of the aircraft.

FIG. 7 illustrates an alternative graphical user interface presentation on the display 416 of the ground crew alert indicator 108 mounted on the front landing gear structure 604 of the aircraft 102. As noted herein, the supplemental alert indicator icon 240, preferably illuminated in a green color, indicates that there is no present danger of collision with a ground object. The supplemental alert indicator icon 242, preferably illuminated in a yellow color, indicates that there is an upcoming danger of collision with a ground object. The supplemental alert indicator icon 244, preferably illuminated in a red color, indicates that there is an immediate danger of collision with a ground object.

An alert indicator 702 indicates that the ground object that may be collided with is to the left side of the aircraft 102, or to the right side of the tug operator when viewing the aircraft 102. An alert indicator 704 indicates that the ground object that may be collided with is to the left side of the aircraft 102, or to the right side of the tug operator when viewing the aircraft 102.

The meaning of these alert indicators 240, 242, 244, 702 and 704 are intuitively understood. Accordingly, when the ground crew alert indicator 108 is mounted on the front landing gear structure 604 of the aircraft 102, the ground crew alert indicator 108 will provide useful alerts to ground personnel, regardless of their native language or nationality.

An example embodiment of the ground crew alert indicator 108 mounted on the landing gear structure 604 of the aircraft 102 includes an inclinometer that senses when the landing gear structure 604 is retracted (in a horizontal position). When the landing gear structure 604 is retracted, the ground crew alert indicator 108 is automatically turned off. When the inclinometer senses when the landing gear structure 604 is extended (in a vertical position), the ground crew alert indicator 108 is automatically turned on.

In the various embodiments, the radar emitter 312, the radar antenna 314, and the radar detector 316 cooperatively operate to obtain radar information to identify ground objects in proximity to their respective radar sensor module 104. Based on the strength of the radar signal emitted by the radar emitter 312, the directionality of the radar antenna 314, and/or the sensitivity of the radar detector 316, the radar sensor modules 104 may detect a ground object that may be in close enough proximity to potentially cause a collision with a portion of the aircraft 102. However, the radar sensor modules 104 may also detect ground objects that are sufficiently far away from the aircraft 102 so as to not be a potential collision hazard. Accordingly, embodiments of the ground crew collision-avoidance system 100 are configured to discriminate between detected ground objects that may be in close enough proximity to potentially cause a collision, and detected ground object that are not in close enough proximity to potentially cause a collision.

In an example embodiment, at least one of the strength of the radar signal emitted by the radar emitter 312, the directionality of the radar antenna 314, and/or the sensitivity of the radar detector 316 are configured to limit the detection range of the radar sensor modules 104 to a relevant detection range. If the ground object is outside of (farther away from) the relevant detection range, then the radar sensor modules 104 will not detect the ground object. Accordingly, the ground crew alert indicator 108 will not issue an alert.

Alternatively, or additionally, the range (or distance) from the detected ground object may be determined. The range of the ground object from the radar sensor modules 104 may be determined by the radar sensor modules 104, the gateway unit 106, and/or the ground crew alert indicator 108 depending upon the embodiment.

The determined range is compared against a predefined range threshold. If the determined range is greater than the range threshold, then the likelihood of collision with the ground object is sufficiently low that the ground crew alert indicator 108 will not issue an alert. On the other hand, if the determined range is at least equal to the range threshold, the ground crew alert indicator 108 will issue an alert. The comparison of the determined range with the range thresholds may be performed by the radar sensor modules 104, the gateway unit 106, and/or the ground crew alert indicator 108 depending upon the embodiment In some embodiments, multiple range thresholds may be used. Different range thresholds may be used depending upon the particular location of the particular radar sensor module 104 that detects the ground object. For example, a first range threshold may be used for radar sensor modules 104 located at the wing tips of the aircraft 102, a second range threshold (that is less than the first range threshold) may be used for radar sensor modules 104 located at the rear of the aircraft 102, and a third range threshold (that is less than the first range threshold and/or the second range threshold) may be used for radar sensor modules 104 located on the engines 122 of the aircraft 102.

Additionally, or alternatively, a first range threshold may be used to generate a warning type alert. Then, a second range threshold (that is less than the first range threshold) may be used for generating an alarm type alert. Other range thresholds may be used to discriminate between other alert levels.

Further, the predefined range thresholds may be adjustable. In some embodiments, the ground crew member or other personnel may selectively specify or adjust the range thresholds. Alternatively, or additionally, the range thresholds may be automatically adjusted based on aircraft velocity and/or direction when being towed. The adjustment to the range thresholds may be performed by the radar sensor modules 104, the gateway unit 106, and/or the ground crew alert indicator 108 depending upon the embodiment.

In alternative embodiments, one or more of the sensor modules may use an alternative type of sensor. That is, rather than a radar sensor, the sensor module may be based on acoustic, sonar, or optical signal sensing.

In an example embodiment, the emitter is an acoustic emitter, such as a speaker or the like, that emits sound signals. The emitted sound may, in some embodiments, have a frequency that is not discernable by a human. The detector is an acoustic detector, such as a microphone or the like, that detects reflected sounds from a ground object.

In another example embodiment, the emitter is a light emitter that emits light signals. The emitted light may, in some embodiments, have a frequency that is not discernable by a human, such as infrared light, ultraviolet light, or the like. The detector is a light detector that detects reflected light from a ground object.

In yet another example embodiment, the detector may be a camera which processes visual images based on light emitted by a light on the aircraft, by light emitted by other lamps or emitted from other lighting fixtures, or from ambient light. Image processing techniques may be used to identify ranges from objects that the aircraft may collide with.

In other embodiments, a laser detection and ranging (LIDAR) system may be employed. Other emitters configured to emit non-visible light energy may be used, wherein the detector is configured to detect the presence of objects.

Accordingly, each of a plurality of sensor modules detect a ground object using a sensor and transmit information associated with the detected ground object to a gateway unit, wherein each of the plurality of sensor modules are uniquely located on a surface of an aircraft that is at risk for collision with a ground object while the aircraft is being towed. Then, at the gateway unit, the information transmitted from the sensor module is received. Then, information associated with the received sensor information is transmitted to the ground crew alert indicator.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A ground crew collision-avoidance system comprising:
  a plurality of radar sensor modules each located at a selected different location on an exterior of an aircraft, wherein each radar sensor module comprises:
    a radar emitter configured to emit a radar signal; and
    a radar detector configured to receive a radar return signal associated with reflections of the emitted radar signal that are reflected from the ground object,
    wherein each radar sensor module communicates radar information corresponding to the respective detected radar return signal;
  a gateway unit communicatively coupled to the plurality of radar sensor modules and configured to receive the radar information communicated from the plurality of radar sensor modules; and
  at least one ground crew alert indicator communicatively coupled to the gateway unit, wherein the at least one ground crew alert indicator is configured to be positioned on an exterior of the aircraft and comprises a display configured to present a graphical alert icon that is visible to at least one member of the ground crew engaged in towing the aircraft,
  wherein information corresponding to a potential risk of collision of the aircraft with the ground object is communicated from the gateway unit to the at least one ground crew alert indicator,
  wherein the at least one ground crew alert indicator is configured to present the graphical alert icon on the display in response to receiving the information from the gateway unit; and
  wherein the at least one ground crew alert indicator is configured to present the graphical alert icon on the display at a presentation location that indicates a location of a potential collision of the aircraft with the ground object.

2. The system of claim 1,
wherein each of the plurality of radar sensor modules further comprises a radio frequency (RF) system configured to wirelessly transmit the radar information associated with the received radar return signal, and
wherein the gateway unit further comprises a RF system configured to wirelessly receive the radar information transmitted from the plurality of radar sensor modules.

3. The system of claim 2, wherein the gateway unit further is further configured to transmit information corresponding to the radar information in a transmitted RF signal, and wherein the at least one ground crew alert indicator further comprises a RF system configured to wirelessly receive a RF signal transmitted by the RF system of the gateway unit.

4. The system of claim 1, wherein each of the plurality of radar sensor modules comprises a processing system configured to determine presence of the ground object based on the radar return signal received by its respective radar detector.

5. The system of claim 1, wherein the gateway unit comprises a processing system configured to determine presence of the ground object based on the radar information transmitted by the plurality of radar sensor modules.

6. The system of claim 1, wherein the at least one ground crew alert indicator comprises an audible warning system configured to issue an audible alert.

7. The system of claim 1, wherein the at least one ground crew alert indicator comprises a first ground crew alert indicator, the system further comprising a second ground crew alert indicator, wherein the second ground crew alert indicator comprises a hand held device.

8. The system of claim 1, wherein the at least one ground crew alert indicator comprises a first ground crew alert indicator, the system further comprising a second ground crew alert indicator, wherein the second ground crew alert indicator is affixed to a tow tug.

9. The system of claim 1, wherein the at least one ground crew alert indicator is affixed to a front landing gear structure of the aircraft.

10. The system of claim 9, wherein the at least one ground crew alert indicator comprises an inclinometer that senses a position of the front landing gear structure, wherein the at least one ground crew alert indicator is configured such that if the position of the front landing gear structure is retracted, then the at least one ground crew alert indicator is automatically turned off, and wherein if the position of the front landing gear structure is extended, then the at least one ground crew alert indicator is automatically turned on.

11. The system of claim 1,
wherein the at least one ground crew alert indicator is configured to present three supplemental alert icons on the display of the at least one ground crew alert indicator,
wherein the three supplemental alert indicator icons are aligned in a vertical row,
wherein a first supplemental alert indicator icon of the three supplemental support icons is located at a lower position of the three supplemental alert indicator icons, the at least one ground crew alert indicator being configured to illuminate the first supplemental alert indicator icon in a green color to indicate that the aircraft is presently free from potential collision with any ground objects;
wherein a second supplemental alert indicator icon of the three supplemental support icons is located at a middle position of the three supplemental alert indicator icons, the at least one ground crew alert indicator being configured to illuminate the first supplemental alert indicator icon in a yellow color to indicate that the aircraft may be at risk of a potential collision with one or more ground objects, and
wherein a third supplemental alert indicator icon of the three supplemental support icons is located at an upper position of the three supplemental alert indicator icons, the at least one ground crew alert indicator being configured to illuminate the first supplemental alert indicator icon in a red color to indicate that the aircraft may be at imminent risk of a collision with one or more ground objects.

12. The system of claim 1, wherein the at least one ground crew alert indicator is a first ground crew alert indicator, and further comprising:
a second ground crew alert indicator,
wherein information corresponding to the potential risk of collision of the aircraft with the ground object is communicated from the gateway unit to the second ground crew alert indicator,
wherein the second ground crew alert indicator is configured to present the graphical alert icon on the display of the second ground crew alert indicator in response to receiving the information from the gateway unit to the second ground crew alert indicator, and
wherein the graphical alert icon is presented on the display of the second ground crew alert indicator at a presentation location that indicates the location of the potential collision of the aircraft with the ground object.

13. A method comprising:
at each of a plurality of radar sensor modules,
emitting, from a radar emitter, a radar signal;
receiving, at a radar detector, radar return signals corresponding to reflections of the emitted radar signal from a ground object; and
transmitting radar information associated with the received radar return signal reflections reflected from the ground object,
wherein each of the plurality of radar sensor modules are uniquely located on a surface of an aircraft;
at a gateway unit,
receiving the radar information transmitted from the radar sensor module; and
transmitting information associated with the received radar information, and
at a ground crew alert indicator positioned on an exterior of the aircraft,
receiving the information transmitted by the gateway unit; and
presenting a graphical alert icon on a display, wherein the display is viewable by at least one member of a ground crew that is towing the aircraft,
wherein the presented graphical alert icon indicates a likelihood of collision between the aircraft and the ground object, and
wherein the presented graphical alert icon indicates a location on the aircraft of the collision between the aircraft and the ground object.

14. The method of claim 13, further comprising determining, by the gateway unit, a likelihood of the collision between the aircraft and the ground object based on the radar information received from the transmitting radar sensor module.

15. The method of claim 13, wherein a color of illumination of the alert icon indicates the likelihood of collision between the aircraft and the ground object.

16. The method of claim 13, wherein an intensity of illumination of the alert icon indicates the likelihood of collision between the aircraft and the ground object.

17. The method of claim 13, further comprising, at the ground crew alert indicator:
presenting a frontal end-on image corresponding to the aircraft on the display,
wherein a presentation location of the alert icon on the frontal end-on image indicates a location on the aircraft of the collision between the aircraft and the ground object.

18. The method of claim 13, wherein at least one radar sensor module of the plurality of radar sensor modules resides in an aircraft light module, the method further comprising:
emitting light from the aircraft light module.

19. The method of claim 13, further comprising, at the ground crew alert indicator:
presenting three supplemental alert indicator icons on the display,
wherein the three supplemental alert indicator icons are aligned in a vertical row, and
wherein presenting the three supplemental alert icons comprises one of:
illuminating a first supplemental alert indicator icon of the three supplemental support icons in a green color to indicate that the aircraft is presently free from potential collision with any ground objects, wherein the first supplemental alert indicator icon is located at a lower position of the three supplemental alert icons;
illuminating a second supplemental alert indicator icon of the three supplemental support icons in a yellow color to indicate that the aircraft may be at risk of a potential collision with one or more ground objects, wherein the second supplemental alert indicator icon is located at a middle position of the three supplemental alert icons; or
illuminating a third supplemental alert indicator icon of the three supplemental support icons in a red color to indicate that the aircraft may be at imminent risk of a collision with one or more ground objects, wherein the third supplemental alert indicator icon is located at an upper position of the three supplemental alert icons.

20. A method comprising:
at each of a plurality of sensor modules,
detecting a ground object using a sensor; and
transmitting information associated with the detected ground object,
wherein each of the plurality of sensor modules are uniquely located on a surface of an aircraft;
at a gateway unit,
receiving the information transmitted from the sensor module; and
transmitting information associated with the received information, and
at a ground crew alert indicator positioned on an exterior of the aircraft,
receiving the information transmitted by the gateway unit;
presenting a graphical alert icon on a display, wherein the display is viewable by at least one member of a ground crew that is towing the aircraft,
wherein the presented graphical alert icon indicates a likelihood of collision between the aircraft and the ground object, and
wherein the presented graphical alert icon indicates a location on the aircraft of the collision between the aircraft and the ground object.

* * * * *